(12) United States Patent
Palnati

(10) Patent No.: US 6,396,838 B1
(45) Date of Patent: May 28, 2002

(54) MANAGEMENT OF FREE SPACE IN AN ATM VIRTUAL CONNECTION PARAMETER TABLE

(75) Inventor: Prasasth R. Palnati, Waltham, MA (US)

(73) Assignee: Ascend Communications, Inc., Westford, MA (US)

( * ) Notice: Subject to any disclaimer, the term of this patent is extended or adjusted under 35 U.S.C. 154(b) by 0 days.

(21) Appl. No.: 09/162,092

(22) Filed: Sep. 28, 1998

(51) Int. Cl.$^7$ ............................................. H04L 12/56
(52) U.S. Cl. ........................... 370/395.31; 370/395.7; 370/397; 370/395.1
(58) Field of Search ................................ 370/393, 395, 370/397, 399, 395.1, 395.3, 395.31, 395.7, 395.72

(56) References Cited

U.S. PATENT DOCUMENTS

| | | | |
|---|---|---|---|
| 5,479,401 A | * 12/1995 | Bitz et al. | 370/60.1 |
| 5,521,917 A | 5/1996 | Watanabe et al. | |
| 5,530,806 A | 6/1996 | Condon et al. | 395/185.02 |
| 5,551,002 A | 8/1996 | Rosich et al. | 395/461 |
| 5,561,786 A | * 10/1996 | Morse | 395/497.01 |
| 5,577,246 A | 11/1996 | Priddy et al. | 395/618 |
| 5,689,512 A | * 11/1997 | Bitz et al. | 370/395 |
| 5,708,660 A | 1/1998 | Riedel | 370/397 |
| 5,774,675 A | 6/1998 | Uchida | 395/200.76 |
| 6,052,374 A | * 4/2000 | Stephens | 370/412 |

\* cited by examiner

*Primary Examiner*—Hassan Kizou
*Assistant Examiner*—Tim Spafford
(74) *Attorney, Agent, or Firm*—Weingarten Schurgin Gagnebin & Hayes

(57) ABSTRACT

Port cards in an ATM switch store parameters for virtual channel connections (VCCs) and virtual path connections (VPCs) in separate areas of a virtual connection parameter table (VCPT), the areas being defined by a VCC pointer and a VPC pointer. Also, a number of "free lists" are used to identify unused single locations (for VPCs) or chunks of locations (for sets of VCCs) that are available for re-allocation. Different free lists are used for different-sized sets of VCCs, i.e., sets configured to use different maximum numbers of VCI bits. When a new VPC is created, a VCPT location identified by an entry in the VPC free list is allocated, if such an entry exists. Otherwise a VCPT location is allocated by advancing the VPC pointer. De-allocation of a VPC entry proceeds in reverse order, i.e., the VPC area is shrunk by backing up the VPC pointer if possible, and if not the de-allocated entry is placed on the VPC free list. Similar allocation and de-allocation processes are used for newly-created VCCs, using the VCC free list appropriate based on the maximum number of VCCs that may be in the set of VCCs. A consolidation technique further backs up the VCC pointer when possible to maximize space available for allocation, and also combines entries from the free lists to create larger-sized chunks. Such combined chunks may be allocated in whole or split into smaller chunks as needed for subsequent allocations.

6 Claims, 9 Drawing Sheets

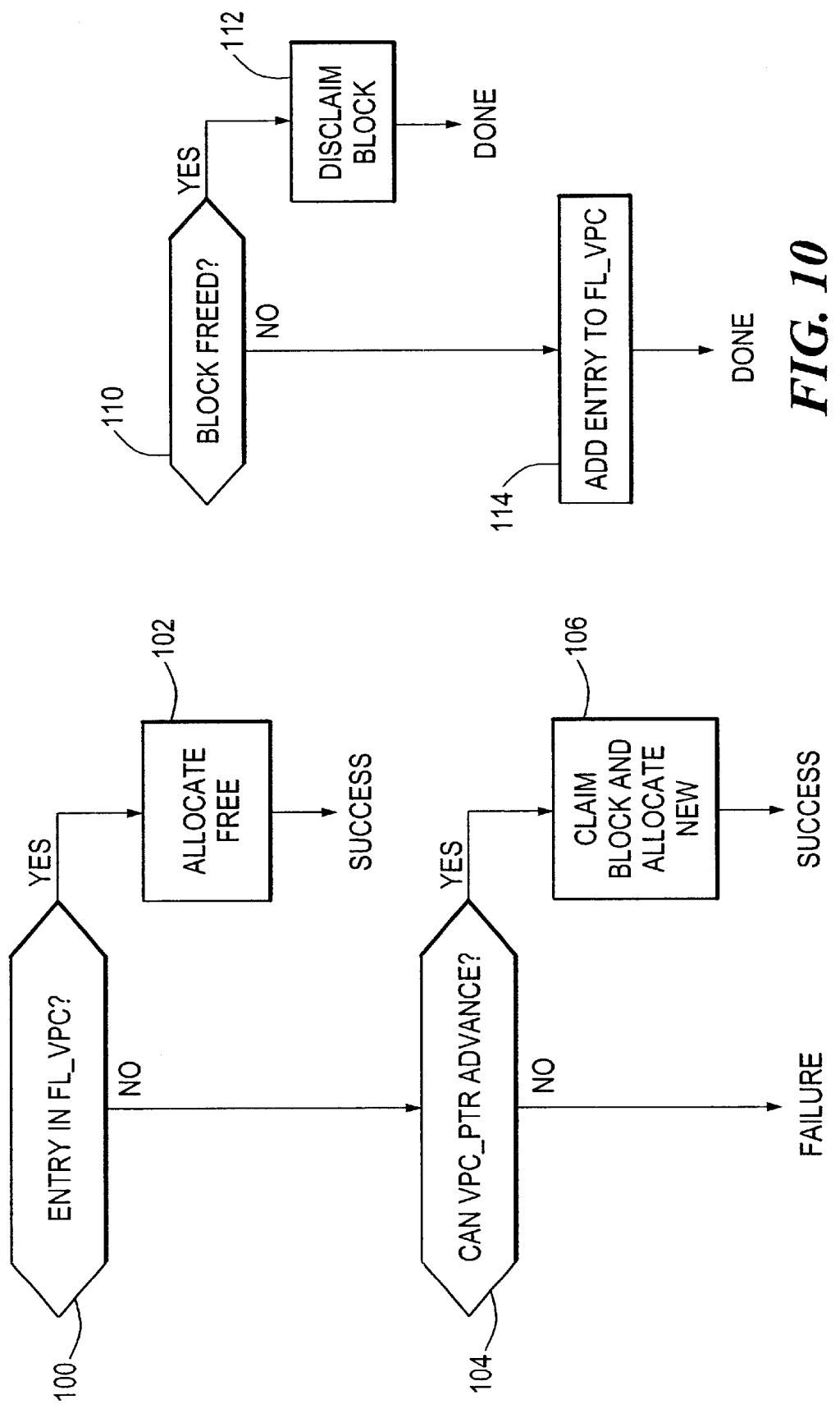

CHUNK CONSOLIDATION

// The free lists are examined in order from smallest to
largest chunksizes (labeled MIN and MAX below). The restart
variable is used to re-start the process at the lowest
chunksize, because as a result of consolidation, more blocks
may have become eligible that were not previously so.//

```
restart = TRUE
while (restart) {
  restart = FALSE;
  for (chunksize = MIN; chunksize <= MAX; chunksize++) {
    current_vcc = FL_VCC[chunksize] ;
    while (current_vcc !=NULL) {
      //
      // Four possible outcomes:
      //
      // Case 1:   Current chunk can be added to central
      //           area 86. Back up vcc_ptr and restart.
      //
      // Case 2:   Current and next chunk (if any) can
      //            be added to central area 86. Back up
      //           vcc_ptr and restart.
      //
      // Case 3:   Current and next chunk (if any) can
      //           be merged into larger chunk. Add bigger
      //           chunk to FL_VCC [chunksize+1] and
      //           continue by looking at next of next_voc.
      //
      // Case 4:   Nothing can be done with current and
      //           next chunks:  Continue by looking at
      //           next_vcc (if any).
      //
    } // while current_vcc not null
    if (restart)
      break;
  } // for loop over chunksize
}// while restart
```

FIG. 13

MANAGEMENT OF FREE SPACE IN AN ATM VIRTUAL CONNECTION PARAMETER TABLE

CROSS REFERENCE TO RELATED APPLICATIONS

None

STATEMENT REGARDING FEDERALLY SPONSORED RESEARCH OR DEVELOPMENT

Not Applicable

BACKGROUND OF THE INVENTION

The present invention is related to the field of Asynchronous Transfer Mode (ATM) networks, and more specifically to the use of a Virtual Connection Parameter Table (VCPT) in an ATM switch in which operational parameters are stored on a per-connection basis.

During the operation of an ATM switch, it is necessary for the switch to perform specific actions in response to receiving a cell at a given input or ingress port. Most notably, the switch must forward the cell to the correct output or egress port. The switch typically performs a variety of other functions as well, such as for example monitoring subscriber data rates to enforce a maximum subscribed rate, and collecting various statistics of network operation to be used by network management software.

For many functions, it is necessary for the switch to store sets of parameters, each set being associated with a given connection. For example, the switch may employ an internal connection identifier (CID) used by components within the switch to forward a cell to the correct egress port. Other per-connection parameters can include such things as a maximum allowed data rate for a connection, and one or more counters used to track some aspect of the connection's operation, such as cell error rate.

The network-wide connections in an ATM are referred to as "virtual" connections. There are two broad classes of virtual connections: "virtual path connections" or VPCs, and "virtual channel connections" or VCCs. VPCs in ATM are specified by an 8-bit field appearing in an ATM cell called the Virtual Path Identifier (VPI). There may be several channels within a VPC; these are specified by a separate 16-bit field called the Virtual Channel Identifier (VCI). All of the channels within a VPC share some operational parameters, including the CID used for forwarding the cells within the switch. The other type of connection, the VCC, is specified by both a VPI and a VCI. In general, there may be multiple VCCs using the same VPI value. The group of VCCs having a given VPI are referred to herein as the "set" of VCCs for that VPI. Different VCCs generally employ different parameters within a switch, including VCCs in the same set.

In order to create the desired association between VPIs/VCIs and their associated parameters within a switch, a table is used that is indexed in some fashion by VPI and VCI values. When a cell arrives at a port, the VPI and VCI from the cell are used to look up the parameters in the table. In the description below, such a table is referred to as a "virtual connection parameter table" or VCPT. A VCPT resides on each line card within a switch, so that it may be accessed quickly and efficiently upon the arrival of a cell at a line card port. The VCPT can be shared among multiple ports on a line card. If that is done, a port identifier is also used as part of the index into the VCPT to distinguish connections having the same VPI and VCI values but appearing on different ports.

As mentioned above, the channels within a given VPC use a common set of parameters. Thus for each VPC on a port only one entry in the VCPT is needed, and this entry can be indexed by the corresponding VPI value alone. Each VCC also requires an entry, which means that for a given VPI there will be a set of VCPT entries, each entry corresponding to a different VCC within the set as identified by the VCI. The maximum number of VCCs in a set that share a given VPI is variable depending on network configuration. VCC set sizes are specified on a per-port and per-VPI basis by specifying the maximum number of VCI bits that may be used to identify a VCC within the set. Thus for example the maximum number of VCI bits may be specified as 10, which corresponds to a net size of 1024 VCCs. Because the number of VCCs within a set is variable, the number of entries that may be needed in the VCPT for a given set of VCCs is also variable. Thus the VCPT must be configured and accessed in a manner that accommodates the differences between VPCs and VCCs, and also accommodates the variability of the sizes of the VCC sets.

Conceptually the VCPT could be directly addressed by concatenating the port identifier and the VPI and VCI from a received cell. Among other impracticalities, such a scheme would be very wasteful of memory, because (1) typically not every VPI and VCI are in active use at a given time on a port, and (2) for VPCs, only one of the block of locations covered by each VPI would be needed. Therefore it would be preferable for the VCPT to be structured so that its storage capacity can be assigned flexibly and re-assigned dynamically in response to the creation and deletion of network connections.

One problem that can arise in dynamic re-assignment schemes is fragmentation of storage space, in which allocated areas are separated by "holes", or empty locations that result from the deletion of connections. If fragmentation is not managed properly, the effective storage capacity of the table may be reduced dramatically, resulting in a reduction in the maximum number of active connections that a switch can handle.

It is desirable to minimize performance-reducing effects such as fragmentation of the VCPT. In general, it is desirable for VCPT space to be allocated and de-allocated in a manner that makes efficient use of VCPT storage capacity, so that the ability of the switch to respond to demand for connections is maximized.

BRIEF SUMMARY OF THE INVENTION

In accordance with the present invention, a technique is disclosed for managing free space in a virtual connection parameter table (VCPT) that enables the flexible assignment of storage capacity to either VPCs or sets of VCCs. For VCCs, VCPT locations are allocated in variable-sized "chunks". Storage efficiency is enhanced by tailoring the size of each allocated chunk to the configured maximum number of VCCs in a set, rather than to the absolute maximum number ($2^{16}$) of VCCs which in practice might seldom or never be used. Also, VCPT locations that become empty as a result of the deletion of connections are reused and/or recycled into larger chunks in a manner that reduces any tendency of the VCPT toward fragmentation.

In the disclosed technique, a VCC pointer and a VPC pointer are maintained which respectively define VCC and VPC areas at opposite ends of the VCPT. The VCC and VPC areas expand into the central area of the VCPT as the pointers are advanced. A number of "free lists" are used to hold the addresses of either single locations (for VPCs) or chunks of locations (for sets of VCCs) that have been de-allocated and are available for re-allocation. There are different free lists for different VCC set sizes that can be configured, i.e., for sets configured to use different maximum numbers of VCI bits. In one embodiment there are separate free lists for set sizes of all powers of 2 between 64 and 16K.

When a new VPC is created, so that a corresponding VPC entry in the VCPT is required, it is first determined whether the VPC free list contains an entry, and if so the VCPT location identified by the entry is allocated as a VPC entry to hold parameters for the new VPC. If the VPC free list does not contain an entry, it is determined whether the VPC pointer can be advanced to expand the VPC area into the central area of the VCPT. If so, the VPC pointer is advanced and a location in the expanded part of the VPC area is allocated. De-allocation of a VPC entry proceeds in reverse order, i.e., if possible the VPC area is shrunk by backing up the VPC pointer, and if not the entry is placed on the VPC free list to be available for a subsequent allocation.

When a new VCC is created, an allocation process similar to the VPC allocation process is carried out if the new VCC is the first VCC being created for a given port and VPI. For each allocation, the appropriate VCC free list is used based on the configured set size. For example, if a given port and VPI are configured to have VCCs identified by 10 bits, an allocation chunk size of 1024 is required. When the VCC pointer is advanced, it advances by an amount sufficient to claim the required-size chunk. As with VPC entries, de-allocation of VCC entries proceeds in reverse order. De-allocated chunks are preferably removed from the VCC area by backing up the VCC pointer, but if that is not possible then the chunks are placed on the appropriate free list.

A consolidation technique is also disclosed that contributes to efficient reuse of de-allocated VCPT entries. The consolidation process is performed whenever a VCC chunk is de-allocated. When possible, the process further backs up the VCC pointer in order to maximize the space available in the central area of the VCPT. The process also combines pairs of entries on the free lists in order to create larger-sized chunks. During subsequent allocations, a combined chunk may be allocated in whole to a same-size set of VCCs, or may be split into smaller chunks and allocated to multiple smaller-sized VCC sets. This technique enhances flexibility and efficiency in the allocation process.

Other aspects, features, and advantages of the present invention are disclosed in the detailed description which follows.

BRIEF DESCRIPTION OF THE SEVERAL VIEWS OF THE DRAWING

FIGS. 9–12 are flow diagrams of processes performed in response to the allocation and de-allocation of entries in the VCPT of FIG. 6; and FIG. 13 is a pseudo-code listing of a consolidation process performed during the de-allocation process of FIG. 12.

DETAILED DESCRIPTION OF THE INVENTION

Figure 1:
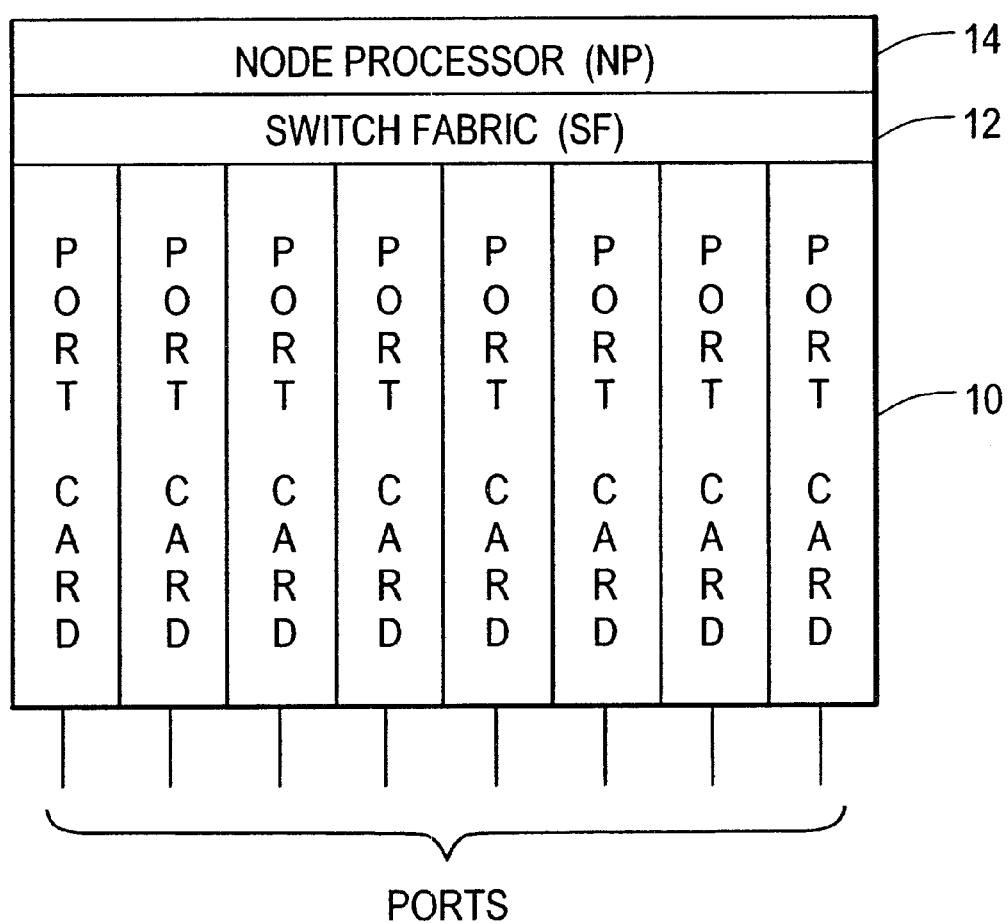
FIG. 1 is a schematic diagram of an ATM switch in accordance with the present invention.

FIG. 1 shows the configuration of a network switch such as an ATM switch. The switch includes a number of port cards 10. Each port card 10 contains one or more ports, or interfaces to physical network segments. For example a port card may contain interfaces to a number of OC3 networks or other high speed networks. The port cards 10 are interconnected by a switch fabric (SP) 12. The switch fabric 12 provides multiple paths for packets or cells that are being forwarded from ingress ports to egress ports. The overall operation of the switch is controlled by a node processor (NP) 14. The node processor 14 is responsible for a variety of functions in the switch, including the configuring of the port cards 10 for proper operation in a network. Specifically the node processor 14 configures the port cards 10 with parameters for the network connections appearing on the various ports, and with parameters identifying connections within the switch that are used to establish network connections.

Figure 2:
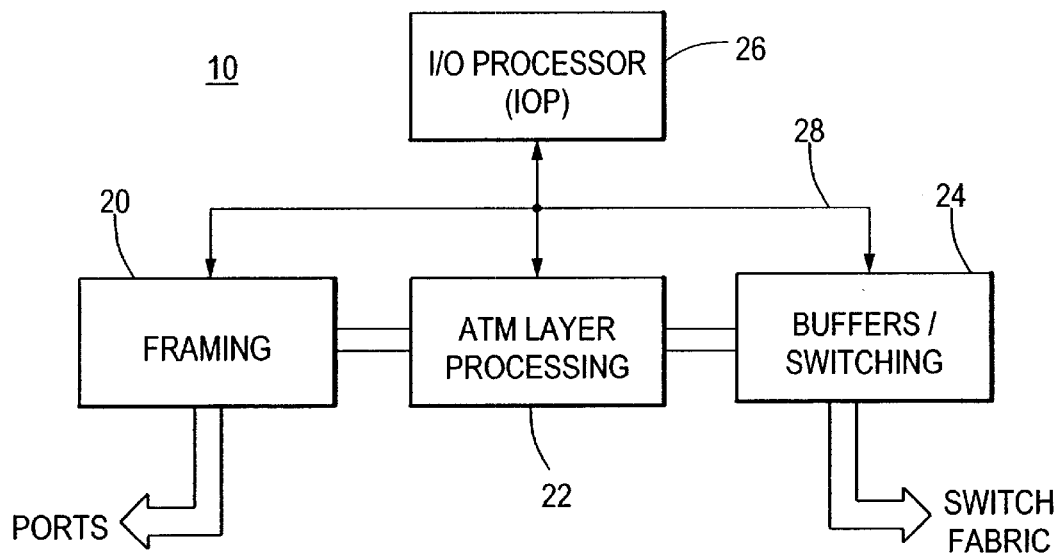
FIG. 2 is a block diagram of a port card in the ATM switch of FIG. 1.

FIG. 2 shows a functional block diagram of a port card 10. As shown, the primary functional block s along the data path between the ports and the switch fabric include framing logic 20, ATM layer processing logic 22, and buffering/switching logic 24. The framing logic 20 identifies and extracts ATM cells from an incoming bit stream on a port, and also frames outgoing ATM cells prior to their transmission on a port. Incoming cells are passed to the ATM layer processing block 22, which performs a variety of ATM layer functions. One of the primary ATM layer functions performed includes identifying a virtual connection to which an incoming cell belongs and retrieving an associated internal connection identifier (CID) used to route the cell to the proper destination port. The contents of the cell and the CID are passed to the buffer/switching block 24, which is responsible for transferring the cell to a destination port card 10 across the switch fabric 12.

An I/O processor (IOP) 26 is responsible for the overall operation of a port card 10. The IOP 26 contains a microprocessor such as an i960 real time processor from Intel Corporation. The IOP 26 also contains memory connected to the microprocessor, and an interface to a bus 28 that interconnects the IOP 26 with the blocks 20, 22, and 24. The IOP 26 is in communication with the node processor 14 of FIG. 1 via the buffer/switching block 24 and the switch fabric 12. The functions performed by the IOP 26 include initialization of the port card 10, as well as configuration of the port card 10 in conjunction with the node processor 14.

Figure 3:
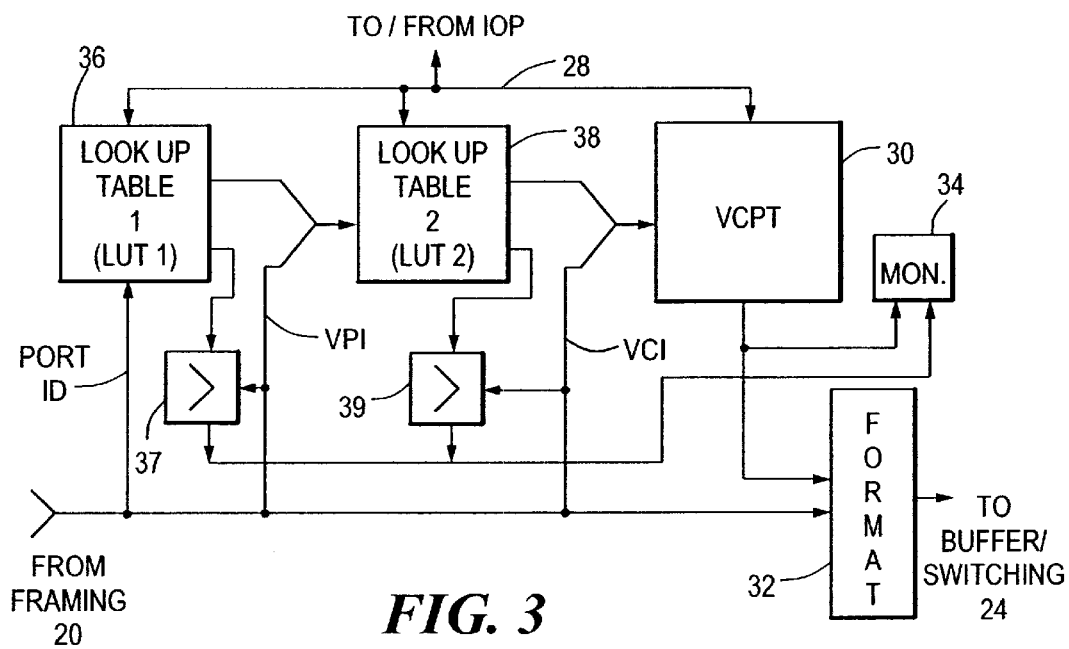
FIG. 3 is a block diagram of ATM layer processing logic in the port card of FIG. 2.

FIG. 3 illustrates part of the ATM layer processing block 22 of FIG. 2. A virtual connection parameter table (VCPT) 30 holds a variety of parameters on a per-connection basis. The parameters include switching parameters used by the buffer/switching block 24 of FIG. 2 to route cells within the switch. The previously mentioned connection identifier or CID is an example of a switching parameter held within the VCPT 30. The VCPT also contains parameters used for policing the behavior of user connections, for example whether the data rate on a connection exceeds a prespecified maximum rate, The VCPT also contains various counters used to collect statistics for system management purposes. The switching parameters from the VCPT 30 are provided to a formatting block 32, where they are appended to incoming cells from the framing block 20 before being passed to the buffer/switching block 24 of FIG. 2. The policing parameters and counters are provided to a monitoring block 34 that carries out the various policing and statistics-gathering functions.

A pair of look-up tables 36 and 38 are used to transform a port identifier (PORT ID) and a virtual path identifier (VPI) received from the framing block 20 into an address for the VCPT 30 in case of VPCs. For VCCs, one part of the VCPT address is formed from the outputs of the tables 36 and 38, and the remaining part is formed from the VCI received from the framing block 20. The VPI and VCI are extracted from fields within an ATM cell, while the port identifier is a value assigned within the switch to identify the port on which a cell is received. Look-up table #1 (LUT1) 36, look-up table #2 (LUT2) 38, and the VCPT 30 reside in high-speed memory within the ATM layer processing block 22, in order to enable fast and efficient processing of ATM cells. As shown, the tables 36, 38, and 30 are accessible by the IOP 26 via the bus 28.

The entries in LUT1 36 are indexed by the port ID. The output from LUT1 36 is a base index of an area in LUT2 38 associated with the corresponding port. As shown, the index from LUT1 and the VPI received from the framing block 20 are concatenated to form an address into LUT2 38. The output from LUT2 38 is an address of an area in the VCPT 30 associated with the corresponding port and the VPI for the incoming cell. In the case of VPCs, this area consists of only one location. In the case of VCCs, the area is a chunk of locations, and the output from LUT2 38 is a base index for the chunk. Thus for VCCs the output from LUT2 38 is concatenated with the VCI from the framing block 20 to form an address for the VCPT 30. As previously described, the output from the VCPT is provided to the formatting block 32 and the monitoring block 34 to carry out their respective functions.

Also shown in FIG. 3 are comparator blocks 37 and 39. Comparator 37 receives a parameter from LUT1 36 that indicates the highest VPI configured on the identified port, and compares that parameter with the VPI of the incoming cell. Comparator 39 performs the same function with respect to the highest VCI configured on the identified port. The comparison results are provided to the monitoring block 34. If either the VPI or VCI exceed the highest configured respective value, the cell is prevented from progressing any further through the switch. Other action may also be taken by the IOP 26 and NP 14 as appropriate.

Figure 4:
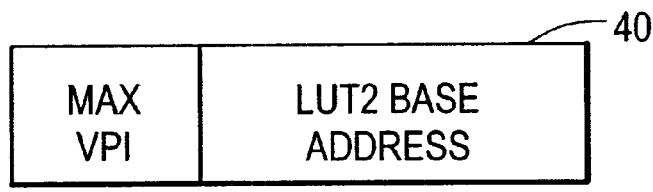
FIGS. 4 and 5 depict the structures of entries in look-up tables in the ATM layer processing logic of FIG. 3.

FIG. 4 shows the structure of the entries in LUT1 36. A field labelled MAX VPI is used to indicate the range of VPIs configured on the port associated with each entry. A second field 40 contains the base address for a corresponding area in LUT2 38.

Figure 5:
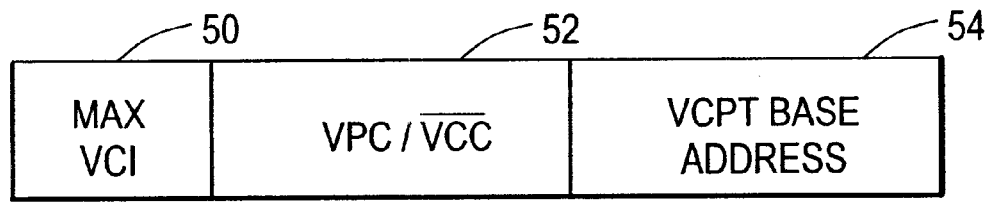

FIG. 5 shows the structure of the entries in LUT2 38. A field 50 labelled MAX VCI is used to indicate the permissible range of the VCIs configured for the corresponding port and VPI. A field 52 is used to indicate whether the VPI is associated with a virtual path connection (VPC) or a set of virtual circuit connections (VCCs). The field 52 is used in a manner described below. A field 54 contains the base address of an area within the VCPT 30 where the parameters for the associated connection or connections are stored.

Figure 7:
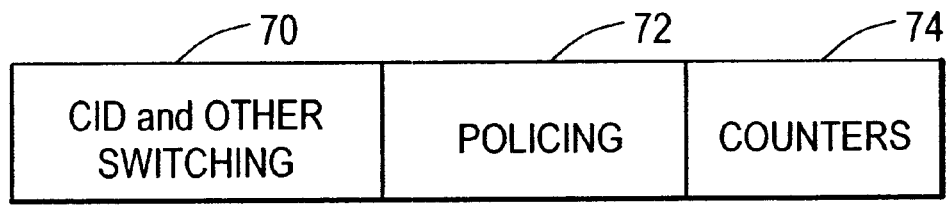
FIG. 7 depicts the structure of an entry in the VCPT of FIG. 6.
Figure 6:
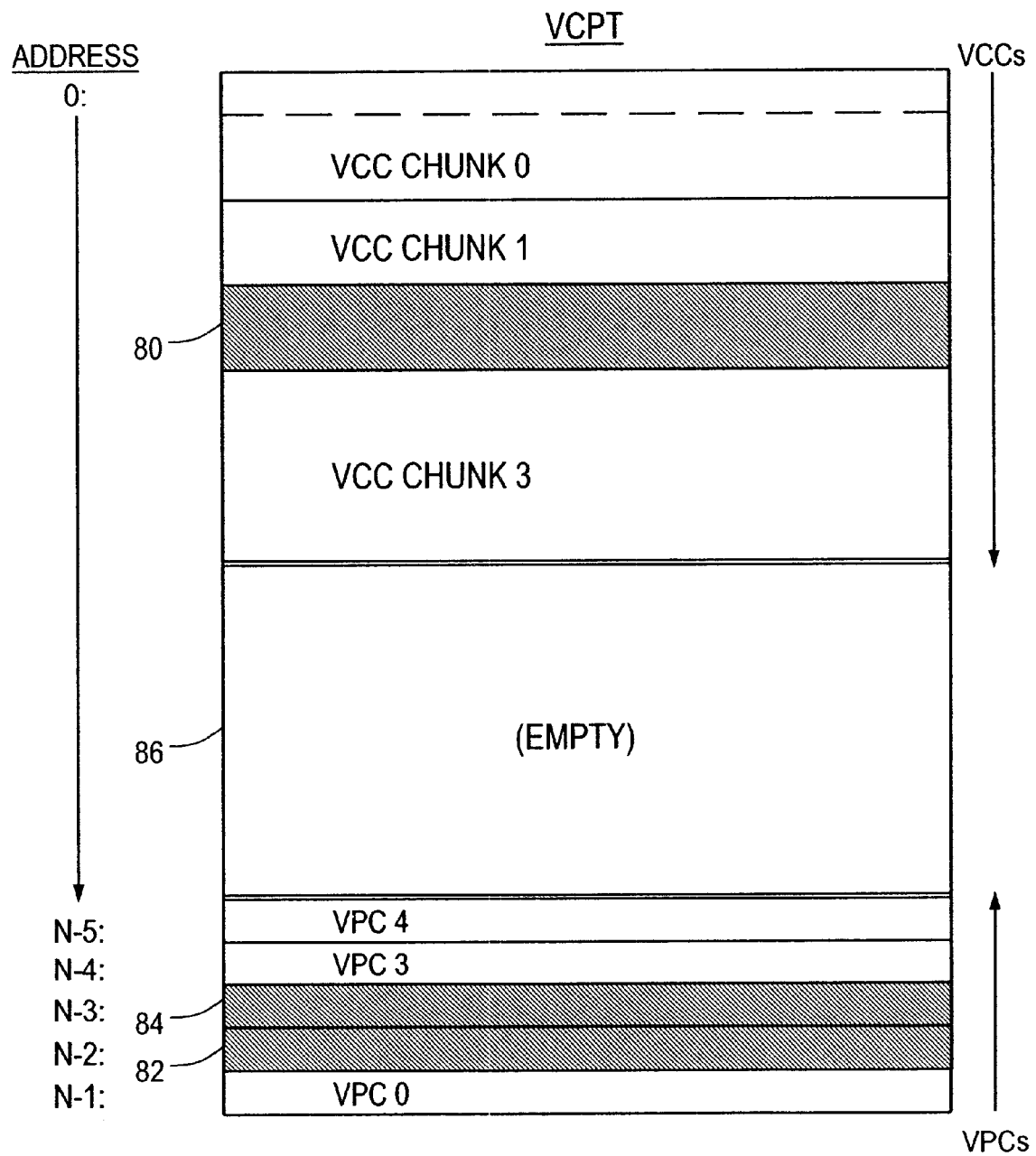
FIG. 6 depicts the structure of a Virtual Connection Parameter Table (VCPT) in the ATM layer processing logic of FIG. 3.

FIG. 6 shows the structure of the VCPT 30. The VCPT contains an array of entries stored at addresses 0 through N−1. Each entry has the structure shown in FIG. 7, including a switching parameter field 70, a policing parameter field 72 and a counters field 74. Two types of entries appear in the VCPT 30. A VPC entry is stored at a single location within the VCPT 30, and is associated with a unique virtual path connection (VPC) configured on the port card. VCC entries are arranged into chunks. Each chunk is associated with a set of virtual circuit connections (VCCs) for a single VPI, and each entry within a chunk is associated with a single VCI for the corresponding VPI.

The size of each VCC chunk is determined by the number of VCI bits used for VCCs as configured at each port. A typical number of VCI bits for VCCs is 10, meaning that up to 1024 VCCs with VCIs in the range from 0 to 1023 can be configured for each VPI established for VCCs at the port. Other ports on the same card can use different values for the number of VCI bits. The chunk size is specified as an integral number of blocks. A useful size for the blocks in the VCPT is 64. According to the ATM standard, the first 32 VCCs within a set (VCCs 0 through 31) are reserved for system use. Thus in order for a set to have room for even one user circuit, a set whose size is the next-higher power of 2, (i.e. 64) must be allocated. Since the minimum useful set size is 64, it makes sense for the minimum block size in the VCPT to also be 64. Other block sizes may be suitable in alternative embodiments.

Although it is not required, it is preferable that the number of blocks in each chunk be a power of 2. Such a constraint enables the various data structures to be managed more easily. In particular, previously-used blocks that have become de-allocated are put back into use more efficiently when the block size is so limited. As a further aid to efficient management, blocks of entries are reserved as needed for use in storing VPC entries. Entries from a reserved block are allocated as individual VPC entries until no more entries in the block are available, at which time the allocation of a new VPC entry will cause another block to be reserved.

FIG. 6 illustrates that at a given time various "holes" or groups of unallocated entries may exist in the VCPT 30. These holes are created when previously-allocated entries are de-allocated in response to the deletion of the corresponding virtual connections. For example, a hole 80 exists where previously VCC chunk 2 existed, and holes 82 and 84 exist where previously VPC entries 1 and 2 respectively existed. To make efficient use of the storage space within the VCPT 30, these holes are reclaimed in a manner described below for subsequent allocation to either VCCs or VPCs.

The VCPT structure shown in FIG. 6 illustrates one technique used to manage free space within the VCPT. The VCPT is divided into three areas: a VCC area extending from the top of the table (address 0) and proceeding downwards toward higher addresses, a VPC area extending from the bottom of the table (address N−1) and proceeding upwards in the table toward lower addresses, and a central area 86 between the VCC and VPC areas. The illustrated arrangement has several advantages. One advantage is that the VCC chunks and VPC entries are not intermingled. This allows for different management techniques to be used on the uniform-sized VPC entries and the variably-sized VCC chunks. Also, locations from the central area 86 can be flexibly assigned to either VCC chunks or VPC entries as required.

Figure 8:
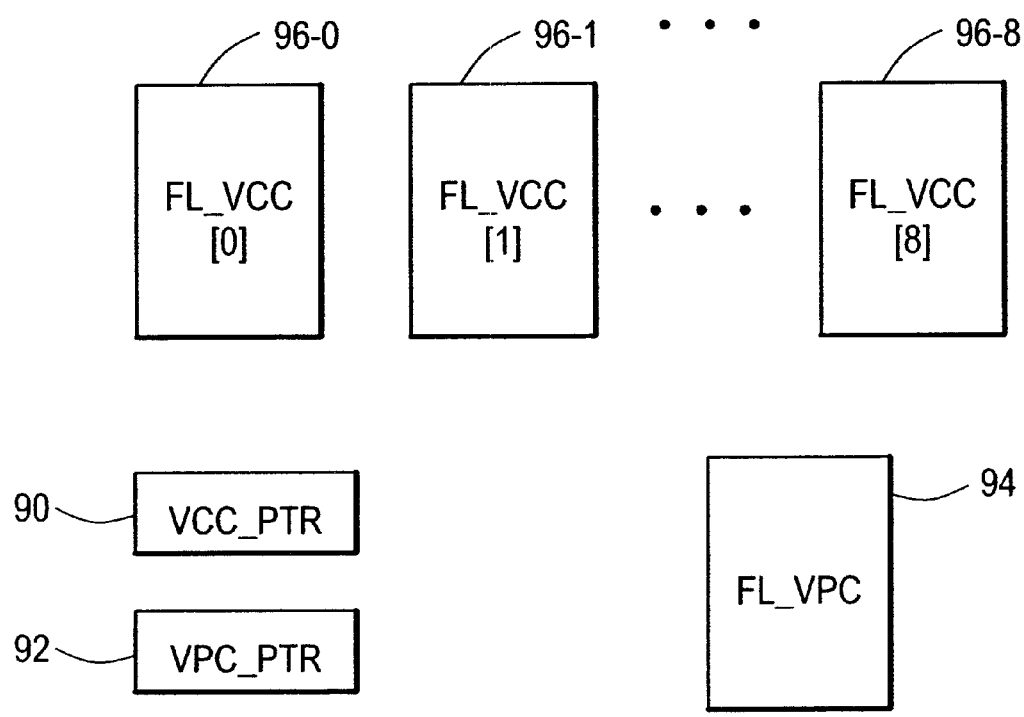
FIG. 8 depicts data structures used to manage free space within the VCPT of FIG. 6.

FIG. 8 shows a set of data structures existing within the IO processor 26 of FIG. 2 that are used to manage free space in the VCPT 30. A VCC pointer 90 is used to hold the address of the block next after the last block in the VCC area, which is also the top block of the central area 86 shown in FIG. 6. A VPC pointer 92 holds the address of the first block in the VPC area, which is also the next block after the bottom block of the central area 86. The VPC pointer 92 is initially set to the value N, while the VCC pointer 90 is initially set to the value 0.

A VPC free list (FL_VPC) 94 contains a list of entries in the VCPT 30 that have been de-allocated after having been allocated to VPCs. These entries are stored in descending order, i.e. in order of decreasing addresses. Thus for the example shown in FIG. 6 the VPC free list 94 would contain the value N—2 followed by the value N—3.

FIG. 8 also shows a set of VCC free lists (FL_VCC) 96-0, 96-1, . . . , 96-8 that are used to identify de-allocated chunks that were previously allocated to VCC chunks. Each VCC free list contains entries for chunks of a given size: VCC free list 96-0 contains entries for chunks of size 64 (i.e. 1-block chunks); VCC free list 1 contains entries for chunks of size 128 (2-block chunks); etc. In general, VCC free list 96-i is used to store de-allocated chunks of size $2^i$ blocks. The entries in each VCC free list are stored in ascending order.

FIG. 9 shows the process by which VPC entries in the VCPT 30 are allocated. This process is performed when a new VPC is being established. At step 100 it is determined whether the VPC free list 94 contains an entry. If so, the entry is allocated from the head of the list 94 in step 102. If not, it is determined in step 104 whether the VPC pointer 92 can be advanced, i.e., whether a block of entries from the central area 86 can be claimed for use as VPC entries. If so, at step 106 the VPC pointer 92 is advanced to claim the block, the first entry moving upward in the VCPT 30 is allocated, and the remaining entries are added to the VPC free list 94 to be used for subsequent allocations. If in step 104 it is determined that the VPC pointer 92 Cannot be advanced, then allocation has failed. An indication is provided to the node processor 14 of FIG. 1, which in turn notifies the requesting process that the requested virtual circuit cannot be established.

FIG. 10 shows the process by which VPC entries are de-allocated. This process is performed when an existing VPC is being deleted. In step 110, it is determined whether as a result of the de-allocation an entire block of contiguous entries at the VPC pointer 92 are free. If so, the block is disclaimed in step 112, i.e., the VPC pointer 92 is backed up by the size of a block and the entries on the VPC free list 94 that are part of the block are deleted. If in step 110 it is determined that an entire block has not been freed, in step 114 the de-allocated entry is added to the VPC free list 94.

Figure 11:
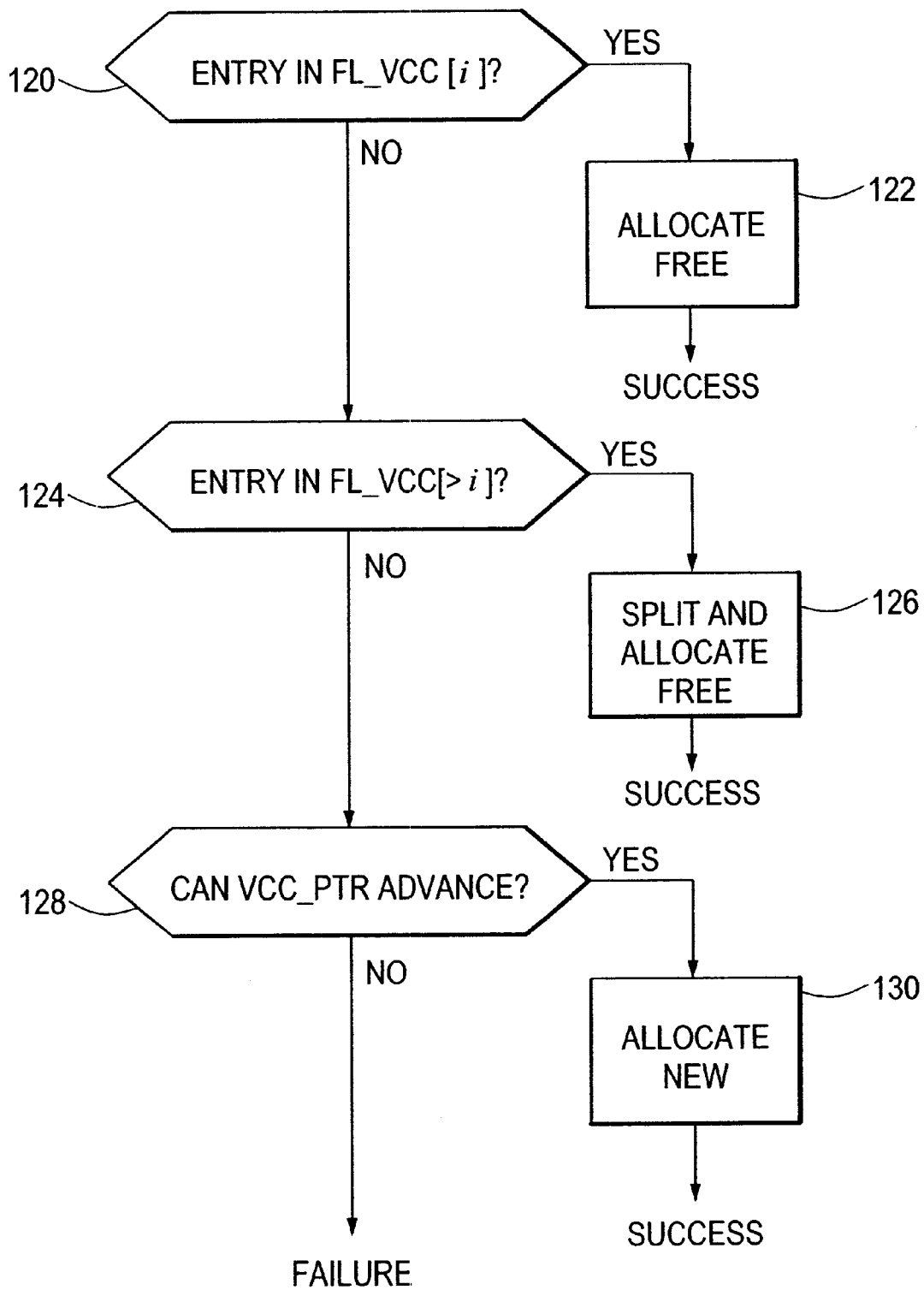

FIG. 11 shows the process by which VCC chunks are allocated. This process is performed when the first VCC in a set of VCCs having a given VPI is being established. In step 120 the appropriate VCC free list (as determined by the number of VCI bits configured on the port) is examined to determine whether it contains an entry. If so, the chunk corresponding to that entry is allocated at step 122. If not, in step 124 it is determined whether any of the VCC free lists for greater chunk sizes contains an entry. If so, the entry from such a VCC free list is split into smaller chunks at step 126. One of the smaller chunks is allocated, and the other chunk or chunks are placed on the appropriate VCC free list or lists.

If at step 124 no entries in another VCC free list can be found, in step 128 it is determined whether the VCC pointer 90 can be advanced. If so, in step 130 a new chunk is allocated from the central area 86, and the VCC pointer 90 is advanced appropriately. If not, allocation has failed. An indication is returned to the node processor 14 as in the case of a failed VPC allocation.

As an example of the process of FIG. 11, assume that the first VCC is being established for a port configured to use a maximum of 10 VCI bits. The corresponding set size is 1024 ($2^{10}$), or 16 blocks. Thus the appropriate VCC free list is FL_VCC[4] 96-4, which is used for chunks of size $2^4$ or 16 blocks. In step 120, FL_VCC[4] is examined for a free entry, and if an entry is found the corresponding chunk is allocated for use by the set of VCCs. If an entry is not found on FL_VCC[4], then FL_VCC[5], FL_VCC[6], FL_VCC[7], and FL_VCC[8] are examined in turn until an entry is found. For the first entry found, the corresponding chunk is split such that at least one chunk of 16 blocks is created. One of these is allocated for the set of VCCs containing the new VCC. The remaining chunks are placed on the appropriate VCC free list or lists, For example, if a chunk having an entry in FL_VCC[5] is split, one chunk is allocated and the other has an entry placed on FL_VCC[4]. If an entry in FL_VCC[6] is found, the chunk is split into one 32-block chunk and 2 16-block chunks. One of the 16-block chunks is allocated, and an entry for the other is placed on FL_VCC[4]. Also, an entry for the 32-block chunk is placed on FL_VCC[5].

Figure 12:
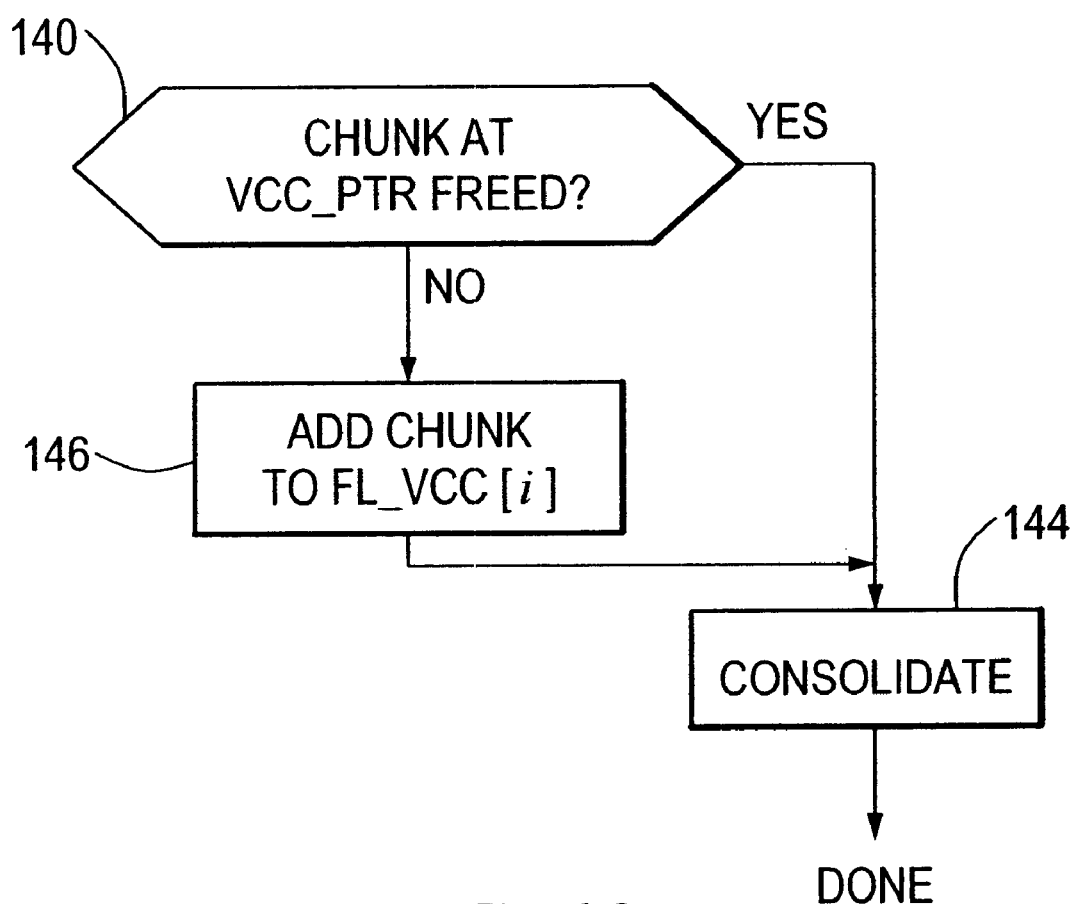

FIG. 12 shows the process by which VCC chunks are de-allocated. This process is performed when an existing VCC is being deleted. At step 140 it is determined whether the bottom-most chunk in the VCC area, as identified by the VCC pointer 90, has been freed. If so, the VCC pointer 90 is backed up appropriately. Then in step 144 a consolidation algorithm is run with the objective of making the VCC pointer 90 as small as possible (i.e. to maximize the size of the central area 86) and to make the freed chunks residing on the various VCC free lists as large as possible. The consolidation algorithm performed at step 144 is described in greater detail below. If at step 140 it is determined that the block at the VCC pointer 90 was not freed, then in step 146 the freed chunk is added to the appropriate VCC free list, and the consolidation process of step 144 is then carried out.

Step 140 is in the nature of an optimization, because it is possible to obtain the same result by performing only steps 146 and 144, i.e., by always adding the freed chunk to the appropriate VCC free list and then consolidating. It may be desirable in alternative embodiments to do so.

FIG. 13 shows the consolidation process carried out in step 144 of FIG. 12. The process consolidates chunks by (1) backing up the VCC pointer 90 to add blocks to the central area 86, and (2) transferring concatenated pairs of chunks from a given free list to the free list for the next larger chunk size. Several scenarios are presented below to illustrate the consolidation operation of FIG. 13. For all the scenarios, it is assumed that there are 16 blocks numbered 0, . . . , 15 in the VCPT 30. Also, the notation "X+" is used to indicate that the VCC pointer 90 is pointing to the first entry following block number X.

Scenario #1

Initial State:
  Block 14 on FL_VCC[0]; all other free lists empty
  All blocks except block 14 are in use
  VCC pointer at 15+.
Upon Block 15 Being Freed:
  1. VCC pointer is backed up to 14+.
  2. Consolidation: FL_VCC[0] is examined, and Case 1 is satisfied. The VCC pointer is backed up to 13+, and FL_VCC[0] becomes empty. After restart, the NULL condition is satisfied for all VCC free lists.

Scenario #2

Initial State:
  Blocks 13 and 14 on FL_VCC[0]; all other free lists empty
  All blocks except blocks 13 and 14 are in use
  VCC pointer at 15+.
Upon Block 15 Being Freed:
  1. The VCC pointer is backed up to 14+.
  2. Consolidation: FL_VCC[o] is examined, and Case 2 is satisfied. The VCC pointer is backed up to 12+, and FL_VCC[0] becomes empty. After restart, the NULL condition is satisfied for all VCC free lists.
NOTE in the foregoing that Case 2 is in the nature of an optimization, because in its absence Case 3 would apply (followed by Case 1 for the next-size VCC free list). It may be desirable in alternative embodiments to omit Case 2.

Scenario #3

Initial State:
  Blocks 11 and 12 on FL_VCC[0]; chunk having blocks 13(14) on FL_VCC[1]; all other free lists empty
  All other blocks are in use
  VCC pointer at 15+.
Upon Block 15 Being Freed;
  1. The VCC pointer is backed up to 14+.
  2. Consolidation: FL_VCC[0] is examined, and Case 3 is satisfied. FL_VCC[0] becomes empty, and FL_VCC[1] then contains 11(12) and 13 (14). Then FL_VCC[1] is examined, and Case 2 is satisfied. FL_VCC[0] stays empty, FL_VCC[1] becomes empty, and the VCC pointer is backed up to 10+. After restart, the NULL condition is satisfied for all VCC free lists.

Scenario #4

Initial State:
  Block 12 on FL_VCC[0]; chunk having blocks 13(14) on FL_VCC[1]; all other free lists empty
  All other blocks are in use
  VCC pointer at 15+.
Upon Block 15 Being Freed:
  1. The VCC pointer is backed up to 14+.
  2. Consolidation: FL_VCC[0] is examined, and Case 4 is satisfied. Then FL_VCC[1] is examined, and Case 1 is satisfied. FL_VCC[0] still contains 12, FL_VCC[1] becomes empty, and the VCC pointer is backed up to 12+. After restart, FL_VCC[0] is again examined, and Case 1 is satisfied. FL_VCC[0] becomes empty, and the VCC pointer is backed up to 11+. After 2nd restart, the NULL condition is satisfied for all VCC free lists.

A technique for managing free space in an ATM virtual connection parameter table has been shown. It will be apparent to those skilled in the art that modification to and variation of the above-described methods and apparatus are possible without departing from the inventive concepts disclosed herein. Accordingly, the invention should be viewed as limited solely by the scope and spirit of the appended claims.

What is claimed is:

1. A method of managing the utilization of a virtual connection parameter table (VCPT) used to hold parameters for virtual path connections (VPCs) and sets of virtual channel connections (VCCs) in an Asynchronous Transfer Mode (ATM) network switch, wherein each set of VCCs is identified by a corresponding unique virtual path identifier (VPI) and each VCC within a set is identified by a corresponding unique virtual channel identifier (VCI), the method comprising the steps of:

(i) maintaining a VCC pointer and a VPC pointer, the VCC pointer defining the extent of a VCC area at one end of the VCPT, and the VPC pointer defining the extent of a VPC area at the other end of the VCPT, the set of contiguous locations between the VCC and VPC areas being referred to as a central area of the VCPT;

(ii) as part of the establishment of a new VPC, performing the steps of:
  (1) determining whether a VPC free list contains an entry, the entry identifying a location in the VCPT that can be allocated to hold parameters for the new VPC;
  (2) if the VPC free list contains an entry, then allocating the VCPT location identified by the VFC free list entry as a VPC entry to hold parameters for the new VPC;
  (3) if the VPC free list does not contain an entry, then determining whether the VPC pointer can be advanced to expand the VPC area of the VCPT into the central area of the VCPT, and if so then performing the steps of:
    (a) advancing the VPC pointer into the central area to claim one or more additional VCPT locations for use as VPC entries; and
    (b) allocating one of the claimed locations as a VPC entry to hold parameters for the new VPC;

(iii) as part of the deletion of a previously-established VPC, performing the steps of:
  (1) determining whether the VPC entry for the deleted VPC is at a marginal location in the VPC area such that the VPC entry can be de-allocated by backing up the VPC pointer to diminish the VPC area of the VCPT;
  (2) if the VPC entry is in such a marginal location, then backing up the VPC pointer to diminish the VPC area of the VCPT such that the marginal location is no longer included therein; and
  (3) if the VPC entry is not in such a marginal location, then adding an entry to the VPC free list identifying the location in the VCPT of the VPC entry for the deleted VPC;

(iv) as part of the establishment of a new VCC, determining whether a chunk of locations in the VCPT was previously allocated to hold parameters for the set of VCCs of which the new VCC is a member, and if such a chunk of VCPT locations was not previously allocated then performing the steps of:
  (1) determining whether a selected one of a plurality of VCC free lists contains an entry, the VCC free lists dedicated respectively to holding entries for different-size chunks of contiguous locations in the VCC area of the VCPT, a chunk of a given size being sufficient to store a correspondingly-sized set of VCCs, the selected VCC free list being the VCC free list for the chunk size of the set of VCCs of which the new VCC is a member;
  (2) if the selected VCC free list contains an entry, then allocating the corresponding chunk of VCPT locations to hold parameters for the set of VCCs of which the new VCC is a member;
  (3) if the selected VCC free list does not contain an entry, then determining whether the VCC pointer can be advanced to expand the VCC area of the VCPT into the central area of the VCPT, and if so then advancing the VCC pointer into the central area to allocate a chunk of VCPT locations for use as VCC entries to hold parameters for the set of VCCs of which the new VCC is a member; and (v) as part of the deletion of a previously-established VCC, determining whether the chunk of VCPT locations containing the VCC entry for the deleted VCC can be de-allocated, and if so performing the steps of:
(1) determining whether the chunk is at a marginal location in the VCC area such that the VCC entry can be de-allocated by backing up the VCC pointer to diminish the VCC area of the VCPT;
(2) if the VCC entry is at such a marginal location, then backing up the VCC pointer to diminish the VCC area of the VCPT such that the marginal location is no longer included therein; and
(3) if the VCC entry is not in such a marginal location, then adding an entry to the appropriate VCC free list identifying the location of the chunk within the VCC area containing the VCC entry.

2. A method according to claim 1, wherein the advancing of the VPC pointer results in claiming a block of VCPT locations for use as VPC entries, and wherein the backing up of the VPC pointer results in disclaiming a block of VCPT locations in which the marginal location is included, and further comprising the steps of:
upon advancing the VPC pointer, adding entries to the VPC free list for all the VCPT locations within the claimed block except for the location allocated as the VPC entry for the new VPC; and
upon backing up the VPC pointer, deleting all the entries in the VPC free list for VCPT locations within the disclaimed block.

3. A method according to claim 1, further comprising the steps of:
determining, if during the establishment of a new VCC it is determined that the selected VCC free list does not contain an entry, whether one of the VCC free lists for chunk sizes greater than the chunk size of the selected VCC free list contains an entry; and
if a VCC free list for a greater chunk size contains an entry, then performing the steps of:
splitting the chunk associated with the entry to yield at least two constituent chunks of VCPT locations, the size of at least one of the constituent chunks being the same as the chunk size associated with the selected VCC free list;
allocating the one constituent chunk of VCPT locations to hold parameters for the set of VCCs; and
adding entries to the appropriate VCC free list or lists for the remainder of the constituent chunks.

4. A method according to claim 1, wherein the chunk sizes associated with the respective VCC free lists are all powers of 2.

5. A method according to claim 1, further comprising the step of performing a re-startable solidation process as part of the deletion of a previously-established VCC, the consolidation process comprising the steps, carried out for each VCC free list in order of increasing chunk size, of:
determining whether the chunk at the head of the free list, if present, can be added to the central area of the VCPT, and if so then:
(i) removing the chunk from the head of the free list;
(ii) backing up the VCC pointer to expand the central area of the VCPT to include the chunk removed from the free list; and
(iii) restarting the consolidation process;

determining whether the chunk at the head of the free list and the next chunk on the free list, if both are present, can be added to the central area of the VCPT, and if so then:
(i) removing the chunks from the free list;
(ii) backing up the VCC pointer to expand the central area of the VCPT to include the chunks removed from the free list; and
(iii) restarting the consolidation process; and
determining whether the chunk at the head of the free list and the next chunk on the free list, if both are present, can be merged together to form a larger chunk, and if so then:
(i) removing the chunks from the free list;
(ii) adding the larger chunk formed by merging the two chunks to the free list for the next larger chunk size; and
(iii) determining whether the new chunk at the head of the free list and the new next chunk on the free list, if both are present after the preceding steps (i) and (ii), can be merged together to form a larger chunk, and if so then repeating steps (i) through (iii) for the two new chunks.

6. A port card for an ATM switch, comprising:
a virtual connection parameter table (VCPT) for holding parameters for virtual path connections (VPCs) and sets of virtual channel connections (VCCs) in an Asynchronous Transfer Mode (ATM) network switch, wherein each set of VCCs is identified by a corresponding unique virtual path identifier (VPI) and each VCC within a set is identified by a corresponding unique virtual channel identifier (VCI);
one or more look-up tables coupled to the VCPT, the look-up tables being operative to translate port identifier, VPI and VCI inputs to an address of a location in the VCPT at which a parameter for a VPC or VCC corresponding to the inputs is stored;
framing logic coupled to the VCPT and the look-up tables, the framing logic being operative to extract the VPI and VCI from an ATM cell received by the port card and to supply the extracted VPI and VCI as address inputs to the VCPT and look-up tables;
formatting logic coupled to the framing logic and VCPT, the formatting logic being operative to append a parameter from the VCPT to ATM cell data received from the framing logic and to forward the combination toward a switch fabric to which the port card is connected during operation; and
a processor coupled to the VCPT and the look-up tables, the processor being operative to manage the utilization of the VCPT by performing the steps of:
(i) maintaining a VCC pointer and a VPC pointer, the VCC pointer defining the extent of a VCC area at one end of the VCPT, and the VPC pointer defining the extent of a VPC area at the other end of the VCPT, the set of contiguous locations between the VCC and VPC areas being referred to as a central area of the VCPT;
(ii) as part of the establishment of a new VPC, performing the steps of:
(1) determining whether a VPC free list contains an entry, the entry identifying a location in the VCPT that can be allocated to hold parameters for the new VPC;
(2) if the VPC free list contains an entry, then allocating the VCPT location identified by the VPC free list entry as a VPC entry to hold parameters for the new VPC, the allocating step including storing the VPC parameters in the VPC entry in the VCPT and creating entries in the look-up tables to translate the port identifier and VPI associated with the VPC to the address of the VPC entry;

(3) if the VPC free list does not contain an entry, then determining whether the VPC pointer can be advanced to expand the VPC area of the VCPT into the central area of the VCPT, and if so then performing the steps of:

(a) advancing the VPC pointer into the central area to claim one or more additional VCPT locations for use as VPC entries; and (b) allocating one of the claimed locations as a VPC entry to hold parameters for the new VPC, the allocating step including storing the VPC parameters in the VPC entry in the VCPT and creating entries in the look-up tables to translate the port identifier and VPI associated with the VPC to the address of the VPC entry;

(iii) as part of the deletion of a previously-established VPC, performing the steps of:

(1) determining whether the VPC entry for the deleted VPC is at a marginal location in the VPC area such that the VPC entry can be de-allocated by backing up the VPC pointer to diminish the VPC area of the VCPT;

(2) if the VPC entry is in such a marginal location, then backing up the VPC pointer to diminish the VPC area of the VCPT such that the marginal location is no longer included therein; and (3) if the VPC entry is not in such a marginal location, then adding an entry to the VPC free list identifying the location in the VCPT of the VPC entry for the deleted VPC;

(iv) as part of the establishment of a new VCC, determining whether a chunk of locations in the VCPT was previously allocated to hold parameters for the set of VCCs of which the new VCC is a member, and if such a chunk of VCPT locations was not previously allocated then performing the steps of:

(1) determining whether a selected one of a plurality of VCC free lists contains an entry, the VCC free lists dedicated respectively to holding entries for different-size chunks of contiguous locations in the VCC area of the VCPT, a chunk of a given size being sufficient to store a correspondingly-sized set of VCCs, the selected VCC free list being the VCC free list for the chunk size of the set of VCCs of which the new VCC is a member;

(2) if the selected VCC free list contains an entry, then allocating the corresponding chunk of VCPT locations to hold parameters for the set of VCCs of which the new VCC is a member, the allocating including storing the VCC parameters for the new VCC in one VCC entry within the allocated chunk in the VCPT and creating entries in the look-up tables to translate the port identifier, VPI, and VCI associated with the VCC to the address of the VCC entry;

(3) if the selected VCC free list does not contain an entry, then determining whether the VCC pointer can be advanced to expand the VCC area of the VCPT into the central area of the VCPT, and if so then advancing the VCC pointer into the central area to allocate a chunk of VCPT locations for use as VCC entries to hold parameters for the set of VCCs of which the new VCC is a member, the allocating including storing the VCC parameters for the new VCC in one VCC entry within the allocated chunk in the VCPT and creating entries in the look-up tables to translate the port identifier, VPI, and VCI associated with the VCC to the address of the VCC entry; and (v) as part of the deletion of a previously-established VCC, determining whether the chunk of VCPT locations containing the VCC entry for the deleted VCC can be de-allocated, and if so performing the steps of:

(1) determining whether the chunk is at a marginal location in the VCC area such that the VCC entry can be de-allocated by backing up the VCC pointer to diminish the VCC area of the VCPT;

(2) if the VCC entry is at such a marginal location, then backing up the VCC pointer to diminish the VCC area of the VCPT such that the marginal location is no longer included therein; and (3) if the VCC entry is not in such a marginal location, then adding an entry to the appropriate VCC free list identifying the location of the chunk within the VCC area containing the VCC entry.

* * * * *